April 14, 1964 R. P. CLAGETT 3,128,648
APPARATUS FOR JOINING METAL LEADS TO SEMICONDUCTIVE DEVICES
Filed Aug. 30, 1961 6 Sheets-Sheet 1
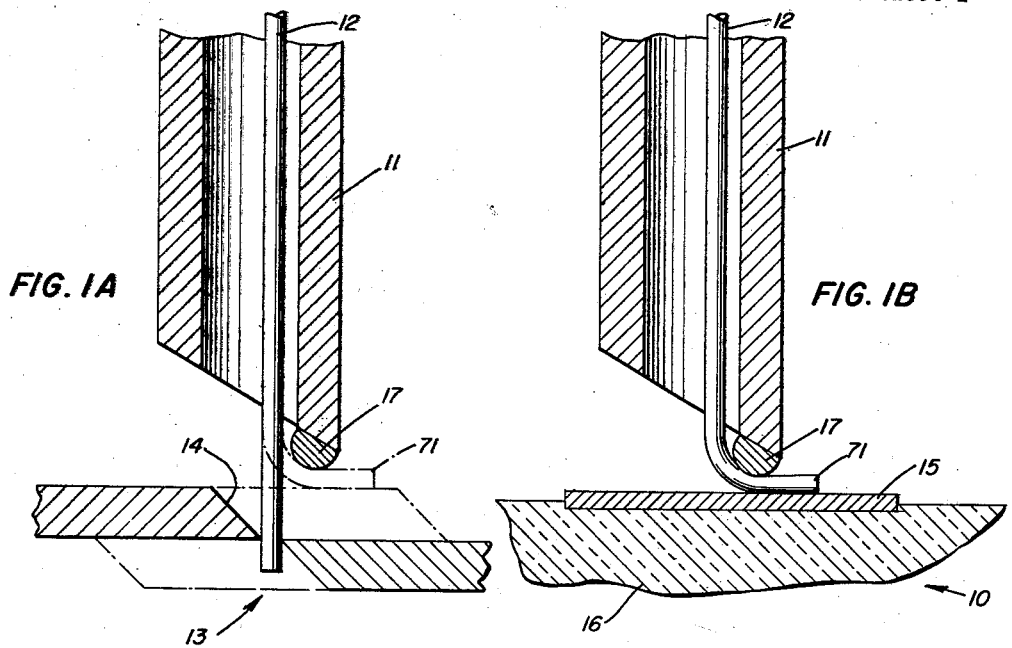
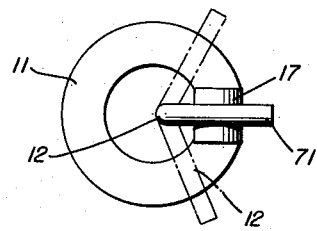
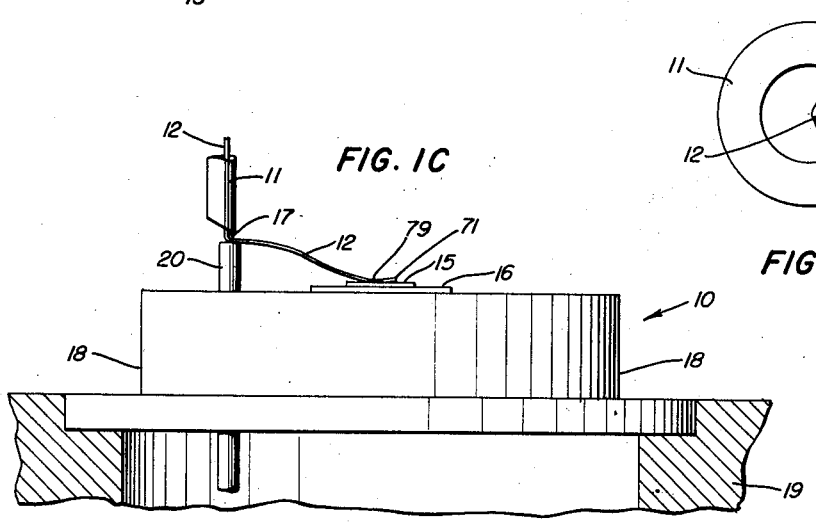
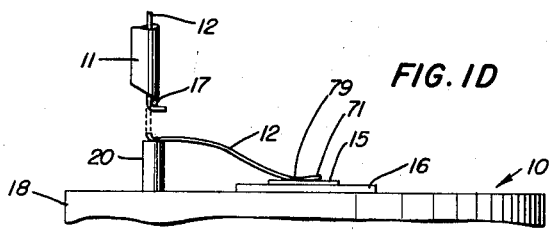
INVENTOR.
R. P. CLAGETT
BY
H. J. Winegar
ATTORNEY April 14, 1964 R. P. CLAGETT 3,128,648
APPARATUS FOR JOINING METAL LEADS TO SEMICONDUCTIVE DEVICES
Filed Aug. 30, 1961 6 Sheets-Sheet 2

INVENTOR.
R. P. CLAGETT
BY
H. J. Winegar
ATTORNEY

April 14, 1964     R. P. CLAGETT     3,128,648
APPARATUS FOR JOINING METAL LEADS TO SEMICONDUCTIVE DEVICES
Filed Aug. 30, 1961     6 Sheets-Sheet 3

INVENTOR.
R. P. CLAGETT
BY H. J. Winegar
ATTORNEY

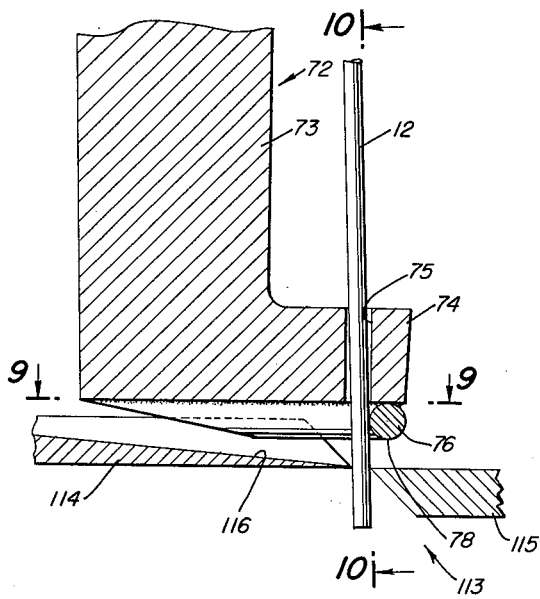
FIG. 7
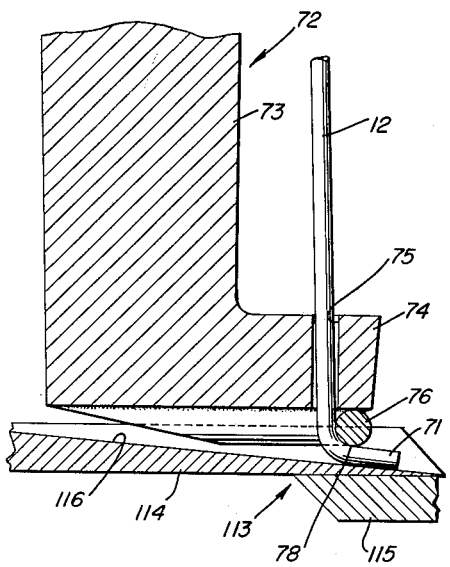
FIG. 8
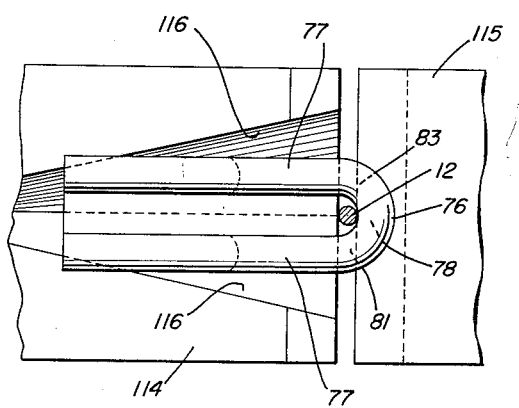
FIG. 9
FIG. 10

April 14, 1964  R. P. CLAGETT  3,128,648
APPARATUS FOR JOINING METAL LEADS TO SEMICONDUCTIVE DEVICES
Filed Aug. 30, 1961  6 Sheets-Sheet 5

INVENTOR.
R. P. CLAGETT
BY
H. J. Winegar
ATTORNEY

April 14, 1964 R. P. CLAGETT 3,128,648
APPARATUS FOR JOINING METAL LEADS TO SEMICONDUCTIVE DEVICES
Filed Aug. 30, 1961 6 Sheets-Sheet 6

*INVENTOR.*
R. P. CLAGETT
BY
*H. J. Winegar*
ATTORNEY

United States Patent Office 3,128,648
Patented Apr. 14, 1964

3,128,648
APPARATUS FOR JOINING METAL LEADS TO SEMICONDUCTIVE DEVICES
Robert P. Clagett, Yardley, Pa., assignor to Western Electric Company, Incorporated, New York, N.Y., a corporation of New York
Filed Aug. 30, 1961, Ser. No. 135,032
24 Claims. (Cl. 78—82)

This invention relates to apparatus for joining leads to semiconductive devices, and more particularly to apparatus in which compression bonding techniques are utilized.

This application is a continuation-in-part of co-pending application Serial No. 821,444, filed June 19, 1959, now Patent 3,087,239.

The small size of semiconductive devices has complicated the task of completely mechanizing their production. To date, the manufacture of transistors, for example, is interrupted by a number of laborious manual steps. A particular difficulty lies in the bonding of conductive leads, which are often finer than a human hair, to semiconductive devices. In the prior art, the handling of these leads required meticulous and time-consuming care. Much of the difficulty arose from the lack of continuous control over each individual lead employed. Thus, for each bond made, an operator had to search for and reassert control over an unsupported end of a tiny individual lead. This not only resulted in wasted motion and loss of time but, more important, it rendered impossible the mechanization of the bonding operation.

An object of the invention is to provide new and improved apparatus for joining leads to semiconductive devices.

A further object of the invention is to provide new and improved facilities utilizing compression bonding techniques for bonding leads to semiconductive devices.

Another object of the invention is to provide new and improved instrumentalities for bonding leads to semiconductive devices wherein control over the leads is continuously exercised.

An apparatus illustrating certain aspects of the invention may comprise a tube, means for feeding a wire-like member through the tube until a portion of the member protrudes, means for orienting the protruding portion of the member between an edge of the tube and a part to which the member is to be bonded, and means utilizing the tube edge for pressing the protruding portion of the member against the part to form a bond between the member and the part.

A complete understanding of the invention may be obtained from the following detailed description of apparatus forming specific embodiments thereof, when read in conjunction with the appended drawings, in which:

FIGS. 1A and 1B are enlarged cross-sectional views, FIGS. 1C and 1D are enlarged elevations and FIG. 1E is an enlarged bottom plan view illustrating succeeding steps in a method forming one embodiment of the invention;

FIGS. 7 and 8 are enlarged sectional views of a horseshoe-type needle bonding device and a lead cutting and orienting device illustrating succeeding steps in a method of the invention;

FIG. 9 is an enlarged sectional view taken along line 9—9 of FIG. 7;

FIG. 10 is an enlarged sectional view taken along line 10—10 of FIG. 7;

Figure 2:
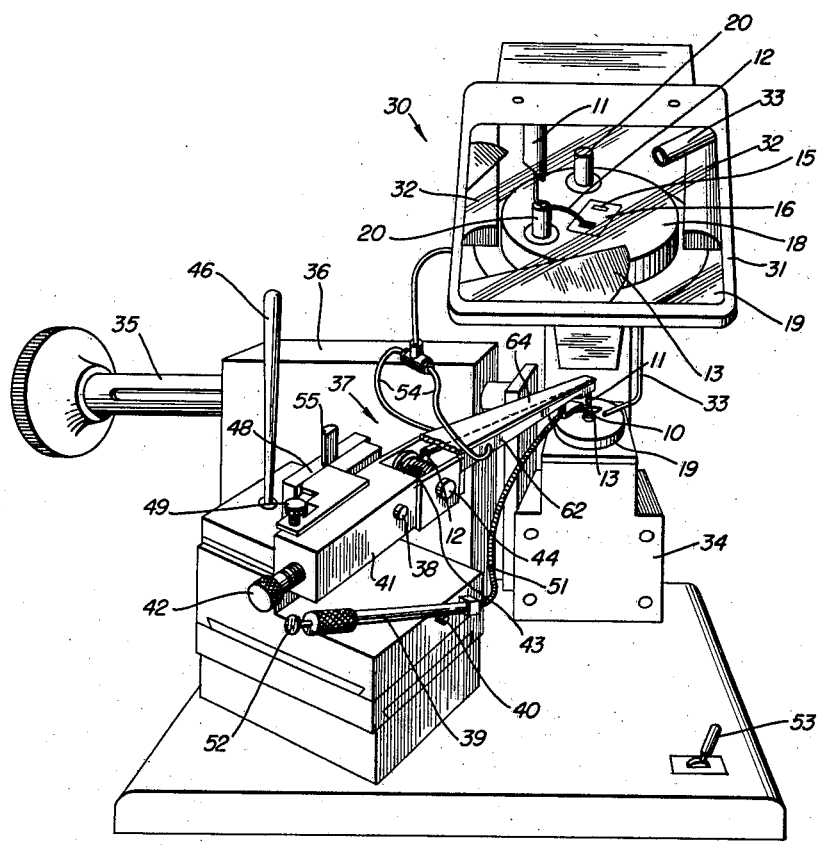
FIG. 2 is a perspective view of a bonding apparatus forming one embodiment of the invention.

Relative dimensions in the figures have often been distorted in order to illustrate the invention more clearly.

FIGS. 1A-1D illustrate the invention as applied in the bonding of conductive leads to a semiconductive device such as a transistor 10. Referring first to FIG. 1A, this embodiment utilizes a rigid tube 11 which may have an inside diameter of 4 mils. A gold, wire-like conductive lead 12 having a diameter of 1 mil, for example, is fed through the tube until a portion of the lead protrudes. The protruding portion is then oriented between an edge of tube 11 and the part to which the lead is to be bonded.

Lead 12 is fed continuously into and through tube 11 in order to avoid the difficulty of dealing with individual lengths of lead. Accordingly, means are provided for cutting the lead when required. A particular advantage, later described, is derived from combining this cutting step with the above-indicated orienting step. Such combination is effected by means of a scissor-like shearing device 13. Shearing device 13 has a beveled cutting edge 14 arranged with its beveled portion facing the tube edge. Thus, with a shearing motion of device 13 transverse to the axis of tube 11, the protruding portion of lead 12 is bent relative to the tube axis at an angle of approximately 90 degrees. In this way, shearing and proper orientation of the conductive lead are accomplished in a single step. The shearing may be effected at any desired position along the protruding portion of lead 12 by selective positioning of cutting edge 14 relative to the tube edge.

The next step in forming the bond is illustrated in FIG. 1B. Only that part of transistor 10 to which lead 12 is to be bonded is shown. In this embodiment, the lead is bonded to an aluminum stripe 15 attached to a semiconductive body 16. Alternatively, the lead may be bonded directly to the semiconductive body. To form the bond, transistor 10 is heated. The protruding portion of lead 12 is then pressed against aluminum stripe 15 with the edge of tube 11. In this way, a firm thermocompression bond is formed between lead 12 and stripe 15. Typically, transistor 10 is heated to a temperature of approximately 325 degrees C, which is well below the melting point of any of the elements involved, while a pressure of approximately 20,000 pounds per square inch is applied to lead 12. To more readily apply such pressure, the tube edge may advantageously be provided with a tungsten tip 17. Furthermore, the edge of tube 11 is preferably slanted away from tip 17 so as to provide adequate clearance.

It should be noted that the invention is not limited to the forming of thermo-compression bonds only. For example, mechanical vibrations at ultrasonic frequencies may be utilized as a bonding aid in place of the heat employed in the instant embodiment.

FIG. 1C illustrates a means for restraining transistor 10 during the bonding operation. The transistor ordinarily comprises a base portion 18 to which semiconductive body 16 is attached. Thus, base portion 18 may advantageously be seated in an accommodating well 19 which is further adapted to apply heat through the base portion to the bonding region.

Semiconductive body 16 normally takes the form of a wafer approximately 3 mils thick. In FIG. 1C, conductive lead 12 is shown as having already been bonded to metallic stripe 15 in wafer 16 as a result of the steps illustrated in FIGS. 1A and 1B. The next step is to electrically connect metallic stripe 15 to its terminal 20. To this end, tube 11 is moved from a position above the metallic stripe to one above the terminal. This movement automatically draws lead 12 through the tube. The tube edge or tip 17 is then pressed against lead 12 to form a thermo-compression bond to terminal 20.

After completing the bond to terminal 20, tube 11 is moved away from the terminal area a distance just sufficient to permit shearing device 13 (FIG. 1A) to shear and bend conductive lead 12, as shown in FIG. 1D. Thus, the connection of metallic stripe 15 to its terminal 20 is effected in a simple and rapid operation during which lead 12 is never left unsupported and control over the lead is never relinquished. Furthermore, the combined shearing and bonding step automatically prepares the device for subsequent bonding operations. Bonding methods utilized in the prior art have required an average of forty-four separate motions for each three-terminal transistor. The present invention reduces the number of motions required to twelve.

Other means for shearing lead 12 may be utilized. For example, referring to FIG. 1C, pressure greater than that required to provide a bond may be applied by tip 17 thereby to bond and break through the lead in one step. Shearing device 13 is preferred, however, because it combines the shearing and orienting steps.

FIG. 2 illustrates an apparatus 30 which may be used to effect the bonding steps illustrated in FIGS. 1A–1D. Manually operated apparatus is shown in order to simplify the description. The bonding methods of the invention, however, readily lend themselves to completely mechanized operation.

Apparatus 30 is provided with a viewing screen 31 which presents a magnified image of the working area to an operator. In the viewing screen, the operator sees base portion 18 of transistor 10 seated in heating well 19. If base portion 18 is flanged, clamps 32 are advantageously provided to hold the transistor in place. The enlarged perspective view of wafer 16 (normally a 30 x 30 mil square) shows two metallic stripes 15 attached thereto. In the illustrated view, the operator has just completed the bonding operation to terminal 20 and is preparing to shear conductive lead 12 with shearing device 13. A tube 33 is employed to envelop the working area with an inert gas in order to prevent oxidation.

Well 19 is actually a replaceable unit seated within an electrical heating unit 34. In this way, different wells may be substituted to accommodate different transistor shapes. Heating unit 34 is supported by an arm 35 which is frictionally engaged by a block 36. Arm 35 may be either rotated or longitudinally translated so as to remove well 19 from the congested working area to facilitate transistor removal and replacement.

Figure 3:
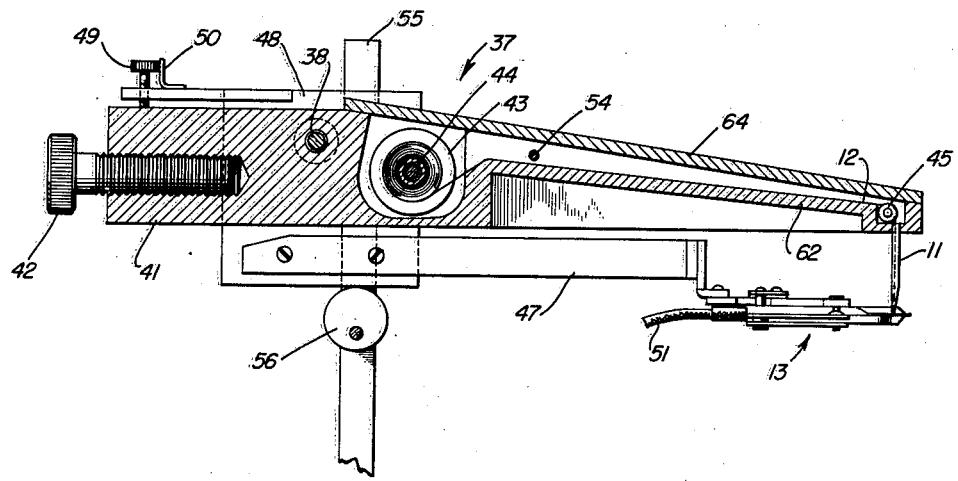
FIG. 3 is an elevation, partly in longitudinal cross-section, of a bonding tool forming part of the apparatus of FIG. 2.
Figure 4:
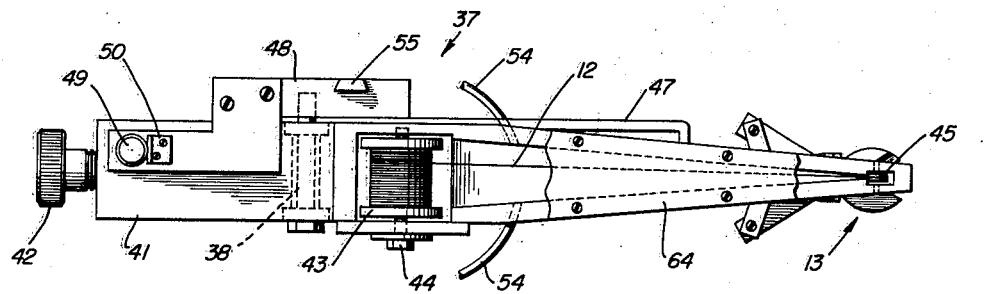
FIG. 4 is a plan view of the bonding tool of FIG. 3.

Tube 11 is advantageously mounted on a bonding tool arm shown generally at 37 and in greater detail in FIGS. 3 and 4. Arm 37 is weighted to rotate clockwise about pivot 38 attached to a stand 48. A set screw 49 passing through an extension of stand 48 restrains arm 37 at a preselected angular position. Ball bearings are preferably employed in the pivot in order to minimize friction. Tube 11 is situated at one extreme of the arm with its axis transversely disposed relative to the axis of the arm. Means are provided for moving pivot 38 relative to transistor 10 in order to bring tube 11 into bonding position. A handle 39 is provided for this purpose. Handle 39 is swingable in a vertical plane, its motion being translated through an eccentric cam 56 (FIG. 3) into up or down movement of stand 48 along a vertical shaft 55.

To form the thermo-compression bond, the edge of tube 11 is brought to bear against lead 12 on terminal 20 by downward motion of pivot 38. Continuation of this downward motion tends to pivot arm 37 counterclockwise about pivot 38. This tendency, however, is resisted by the weight of the arm, so that a substantially constant pressure is applied to lead 12 throughout the downward motion of pivot 38. A stop 40 for handle 39 is provided to automatically halt downward movement of pivot 38 at a preselected position. The amount of pressure applied may be adjusted by the provision of a counterweight 41 having a movable portion, in this case a screw 42, for shifting the center of gravity of the weight relative to pivot 38.

It is, of course, possible to provide other means for applying a constant pressure to lead 12. For example, tube 11 may be biased with a spring which applies a constant reverse pressure as the tube edge is brought to bear against the lead.

Arm 37 also provides support for a spool of conductive lead 43 rotatably mounted on an axis 44. The spool holds a suitable supply of the conductive lead. Thus, in moving tube 11 from one bonding position to another, conductive lead 12 is reeled off spool 43 as desired. Advantageously, precise horizontal positioning of arm 37 is provided by manipulation of a joystick 46 through a control system which may, for example, be of the type described in an article by W. L. Bond entitled "Micromanipulators" and published in the 1956 Bell Laboratories Record, vol. 34, pages 90–92.

Lead 12 is preferably guided by a pulley 45 in order to prevent binding. If binding does take place, however, pressurized gas may be applied to dislodge the lead. The gas should be applied in short bursts, as by a rapid flick of a toggle switch 53. Furthermore, the gas should be applied equally to either side of lead 12 to prevent lateral displacement of the lead. To this end, two gas conduits 54 connected to opposite sides of arm 37, respectively, may be utilized.

Shearing device 13 is advantageously mounted on an extension member 47 attached to stand 48. Adjustable vertical positioning of the shearing device relative to the edge of tube 11 in order to control the position along lead 12 at which shearing is to take place may then be effected by means of set screw 49. A spring 50 is provided to maintain the set screw in a selected position.

In the apparatus shown, scissor-like shearing device 13 is operated through a flexible coupling 51. This permits the operation of the shearing device to be effected remotely, for example, through a push button 52 placed on handle 39. An operator may thereby effect all the operations required for bonding leads to a transistor through the medium of joystick 46 and handle 39. With the apparatus described, an operator may readily produce 150 units per hour as compared to the prior-art rate of approximately 15 units per hour. Complete mechanization would undoubtedly increase this figure markedly.

Figure 5:
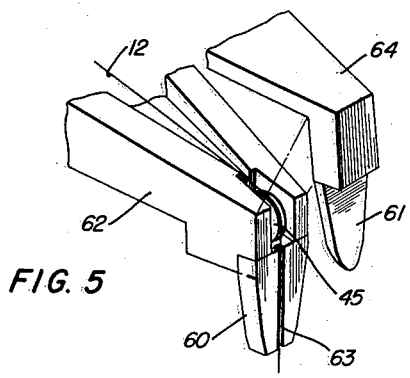
FIGS. 5 and 6 are perspective views illustrating an alternative tube arrangement which may be employed with the bonding tool of FIGS. 3 and 4.
Figure 6:
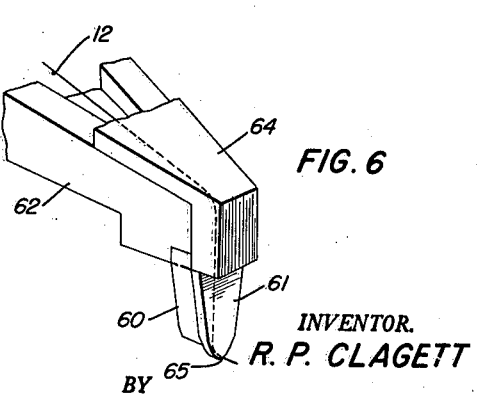

The tube arrangement illustrated in FIGS. 5 and 6 may be used with arm 37 of FIGS. 3 and 4 in place of tube 11. In such an arrangement, a tube is formed of separable parts 60 and 61. Part 60 is attached to a base portion 62 of arm 37 and has a channel 63 therein for lead 12. Part 61 is attached to a cover portion 64 of arm 37 so as to be removable with the cover. The cover may be hinged or otherwise suitably attached to the base portion. This considerably eases the task of initial set-up since the threading of lead 12 through a one-piece tube is eliminated. The attachment of cover 64 to base 62 automatically brings part 61 into its proper position relative to part 60 to form a tube enclosing lead 12. Part 61 can be made of carbide, for example, and has a rounded nose 65 which extends below part 60 for the application of bonding pressure.

In preparing the lead 12, FIGS. 1A and 1B, for bonding, as previously mentioned, such lead 12 is fed through tube 11 until a portion of the lead 12 protrudes beyond the lower edge of tube 11. When this portion of lead 12 is cut to a predetermined length and bonded, a tail 71 is formed, as shown in FIG. 1B.

Figure 13:
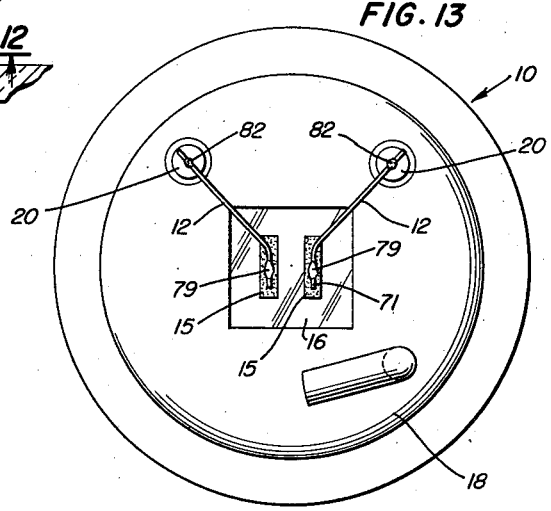
FIG. 13 is an enlarged plan view of a transistor having leads attached thereto with the horseshoe-type needle bonding device of FIGS. 7-10, or the toroidal-type needle bonding device of FIGS. 11 and 12.

In making the bond, it is important to maintain the tail 71 parallel to stripe 15, FIG. 13, so that such tail 71 will not come into contact with the semiconductive body 16. This is because such contact by tail 71 with body 16 would short out such stripe 15 and cause the ultimate transistor to be defective. Moreover, if lead 12 is bonded with tube 11 of FIGS. 1A-1E to form a bond 79, FIG. 13, there is a tendency of lead 12 to move circumferentially relative to tip 17 while the tube 11 is being moved from bond 79 toward terminal 20. Such relative motion may be sufficient to cause lead 12 to lose contact with tip 17, as is clearly shown in phantom outlines in FIG. 1E. From FIG. 13, it is apparent that this motion is at an angle, and lateral with respect to the central longitudinal axis of stripe 15. If lead 12 loses contact with tip 17, as shown in phantom outlines in FIG. 1E, due to this motion, a very unsatisfactory bond, if a bond at all, is formed when tube 11 is forced downwardly on terminal 20, since tip 17 would strike terminal 20 and lead 12 would be compressed very little, if at all, between tube 11 and terminal 20.

To prevent lead 12 from losing contact with tip 17 of tube 11 during lateral motion from the bond 79 to terminal 20, a horseshoe-type needle bonding device, designated generally by the numeral 72 and shown in FIGS. 7-10, may be used with bonding tool arm 37 of FIGS. 3 and 4 in place of tube 11. The horseshoe-type needle bonding device 72 includes an elongated body portion 73 having a tab 74 preferably integral therewith. Such body portion 73 and tab 74 may advantageously be formed of stainless steel.

In order to provide a hard and impenetrable bonding surface and to prevent metal of lead 12 from sticking to the needle bonding device 72 after the bonding operation, an elongated cylindrical tip 76, composed of a material which is hard relative to lead 12, is fixed by welding or the like to the lower surface near the outer edge of tab 74. Tip 76 roughly has the configuration of a horseshoe and includes a pair of parallel sides 77, FIG. 9. Also, tip 76 may conveniently be formed from a tungsten wire of circular cross-section, or the like. Advantageously, tip 76 is tapered away from tab 74, as shown in FIGS. 7 and 8 to provide adequate clearance during bonding. In addition, to provide optimum bond mash-out and strength, the diameter of the cross-sectional area of tip 76 is about twice as large as the diameter of lead 12.

Formed in tab 74 is a passageway 75 for guiding lead 12 beyond bonding tip 76 to a lead shearing and orienting device, designated generally by the numeral 113 and operated in the same manner as the lead shearing and orienting device 13. Typically, lead 12 has a diameter of about one mil (roughly one-quarter the size of a humain hair) and passageway 75 has a diameter of about 1.6 mils.

The shearing and orienting device 113 includes an upper cutting blade 114 and a coacting lower cutting blade 115. As is clearly shown in FIGS. 7-10 the surface of the upper blade 114 subjacent bonding tip 76 has a V-shaped notch 116 formed therein. This notch 116 serves to orient the lead 12 by bending the lead 12 at a predetermined angle about the bonding tip 76 and guiding the lead 12 such that the tail 71 thereof is parallel with the longitudinal axis of the sides 77 of the bonding tip 76. Moreover, by using the shearing and orienting device 113 having notch 116 in the upper blade 114, tail 71 is shorter and lead mash-out between the bonding tip 76 and the shearing and orienting device 113 is less than if the shearing and orienting device 13 were used.

Since the length of passageway 75, through which lead 12 is threaded in preparation for bonding, is smaller than the length of the passageway of tube 11, FIGS. 1A-1E, threading of the needle bonding device 72 with lead 12 is greatly facilitated, and there is less likelihood of clogging of passageway 75. Moreover, the tab 74 facilitates the threading of device 72 inasmuch as a tweezer (not shown) holding the lead 12 may be placed directly over passageway 75 while device 72 is supported by the elongated body portion 73.

In operation, the lead 12 is threaded through passageway 75, FIGS. 7-10, of needle bonding device 72 beyond the shearing and orienting device 113. Next, device 113 is actuated to move blades 114 and 115 together to first shear lead 12 so that it extends a predetermined distance beyond tip 76, and then orients the tail 71 of lead 12 between tip 76 and notch 116 of the upper blade 114 so that tail 71 is parallel with the sides 77 of tip 76. Next, the needle bonding device 72 is positioned over the contact area or stripe 15, FIG. 13, whereupon the device 72 is forced downwardly to produce a great pressure between a central portion 78, FIG. 9, of tip 76 and stripe 15, which is preferably pre-heated, to form a bond 79. Typically, the bonding pressure may be about 20,000 pounds per square inch and the part to be bonded to may be heated to a temperature of about 325 degrees C. The bonding time may vary from about 5 seconds to about 10 minutes.

After the formation of bond 79 the needle bonding device 72 is maintained stationary about its longitudinal axis and is moved upwardly and angularly away from stripe 15 towards terminal 20. Alternatively, transistor 10 may be similarly moved to accomplish the same effective movement. During the movement of device 72 lead 12 is unwound under tension from spool 43, FIGS. 3 and 4, an amount equal to the distance from stripe 15 to terminal 20 and is maintained in contact with tip 76. Next, the needle bonding device 72 is positioned over terminal 20, whereupon device 72 is forced downwardly to produce a great pressure between a side portion 81, FIG. 9, of tip 76 and terminal 20, FIG. 13, which is preferably preheated, to form a bond 82. After bond 82 has been formed, shearing and orienting device 113, FIGS. 7 and 8, is again actuated to sever the lead 12 to a predetermined length.

Similarly, lead 12 is bonded to the other stripe 15, FIG. 13, and other terminal 20 of transistor 10, except that another side portion 83, FIG. 9, of tip 76 is used to form the bond on the other terminal 20. Thus, with the horseshoe-type needle bonding tool 72, mechanically strong and electrically low resistant bonds 79 and 82 are effected. Additionally, tails 71 of bonds 79 do not contact semiconductive body 16.

Figure 11:
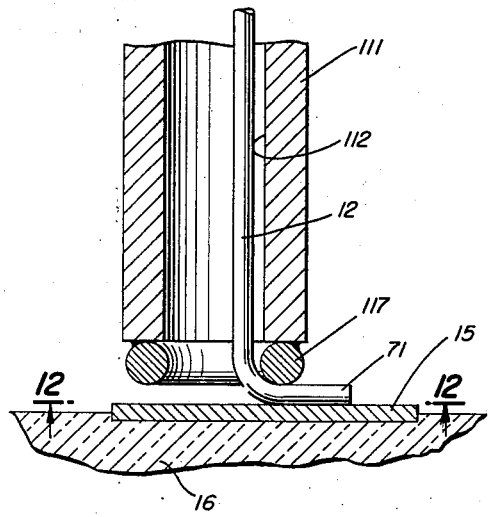
FIG. 11 is an enlarged sectional view of a toroidal-type needle bonding device.
Figure 12:
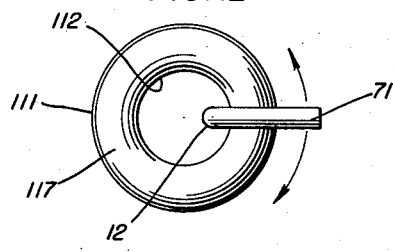
FIG. 12 is an enlarged bottom plan view of the device of FIG. 11.

In the event it is desired to bond lead 12 to a plurality of diversely positioned points, a toroidal-type needle bonding device 111, FIG. 11, having a passageway 112 therethrough may be used. Fixed to one end of device 111 is a bonding tip 117 having the configuration of a toroid and preferably formed of a tungsten wire of a diameter twice as large as that of lead 12. As is apparent from FIG. 12, lead 12, which is threaded through passageway 112, may be rotated circumferentially in the directions of the arrows through 360°. Obviously, in bonding with device 111, a first bond can be effected with lead 12 and then a plurality of subsequent bonds can be effected at any angle relative to the first bond without severing lead 12. Since, the operation of the toroidal-type needle bonding device 111 is similar to the operation of tubular device 11, FIG. 1A–1E, such operation is not set forth here in detail.

In the manufacture of transistors of high frequency, stripes of very small areas (for example, 2 mils x 4 mils) are formed very close together on a semiconductive body. Due to these exceedingly small stripes, leads of extremely small diameter must be used to connect the stripes to transistor terminals. Typically, such leads are finer than a human hair and measure about one mil in diameter. These leads of extremely small diameter are very costly due to the difficulty of manufacturing them. If a lead having a slightly larger diameter could be used to connect the stripes to the terminals, production cost of transistors could be substantially decreased. However, if such a larger lead is used, bond mash-out problems arise. More particularly, if lead 12 of a larger diameter than that used in conjunction with the needle bonding devices of FIGS. 1A–1E and FIGS. 7–12 is employed, a bond 84, FIG. 14, results. Obviously, a larger bond mash-out than is tolerable exists. This mash-out is so great that part of the metal of the bond 84 touches a portion of semiconductive body 16, thereby completing shorting out the stripe 15. To overcome this bond mash-out and still use the larger diameter, less costly lead 12 for the same size stripe 15, a groove-type needle bonding device, designated generally by the numeral 85 and shown in FIGS. 15–18, may be used with bonding tool arm 37 of FIGS. 3 and 4 in place of tube 11. This device 85 permits the use of a larger diameter lead than may be used with the needle bonding devices of FIGS. 1A–1E and FIGS. 7–12 and, at the same time, reduces the lead mash-out at the bond so as not to short circuit the aluminum stripe 15.

Referring now to FIGS. 15–18, there is shown the groove-type needle bonding device 85 which includes an elongated tubular member 86 having a passageway 87 extending therethrough. One end of elongated member 86 is tapered by four surfaces 88, 89, 91, and 92, as clearly shown in FIG. 17, to form a truncated apex surface 93. Preferably, this surface 93 is geometrically plane and disposed at a right angle to the longitudinal axis of passageway 87.

Fixed by welding, or a similar attaching method, to the truncated apex surface 93 is a bonding tip composed of a pair of parallel contiguous cylindrical members 94 of a material, such as tungsten wires or the like, which is hard and impenetrable as compared to lead 12. These cylindrical members 94 form a groove 95, FIG. 18, preferably at a right angle to passageway 87 so that the longitudinal axis of a bent portion 96, FIG. 16, of lead 12 extends radially from such passageway 87. Additionally, the diameter of cylindrical members 94 may advantageously be made twice that of the lead 12 to be bonded to obtain a sufficiently deep groove 95 thereby providing optimum mash-out and strength in the ultimate bond. Moreover, cylindrical members 94 are tapered towards passageway 87 to form a smooth surface with a chamfered edge 97.

In operation, lead 12 is fed through passageway 87 beyond lead shearing and orienting device 113. Next, device 113 is actuated to first shear lead 12 so that it extends a predetermined distance beyond cylindrical members 94, and then orient portion 96, FIG. 16, of lead 12 between cylindrical members 94 and notch 116 of the upper blade 114 so that portion 96 fits into groove 95. After such shearing and orientation, the device 113 is withdrawn and the groove-type needle bonding device 85 is brought forcefully downward on the stripe 15, which is preferably pre-heated, to form a bond 98, shown greatly enlarged in FIG. 19.

Figure 14:
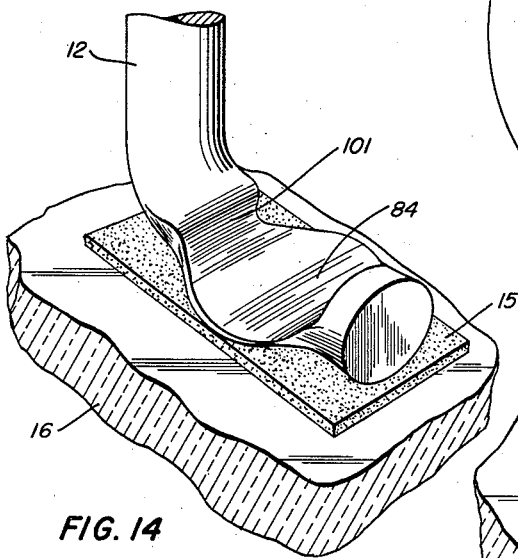
FIG. 14 illustrates an enlarged bond made with the bonding devices of FIGS. 1A-1E and 7-12.
Figure 19:
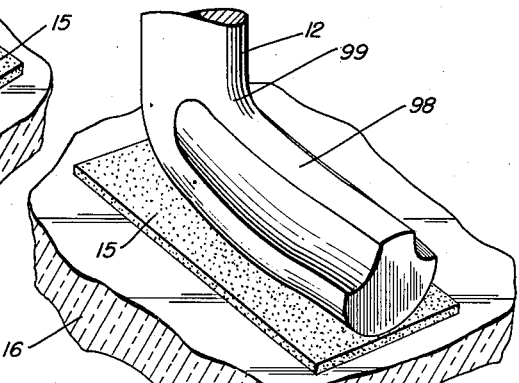
FIG. 19 is an enlarged view of a bond made with the bonding device shown in FIGS. 15-18, illustrating the bonding surface between a lead and an element mounted on a semiconductive device.

From a careful examination of the bond 98 of FIG. 19 and comparison of such bond 98 with bond 84 of FIG. 14, it is apparent that there is a much larger bonding surface with bond 98 than there is with bond 84. That is, with bond 98 there is much more contact with stripe 15 than there is with bond 84. Thus, bond 98 is mechanically stronger and has lower electrical resistance than bond 84.

Figure 15:
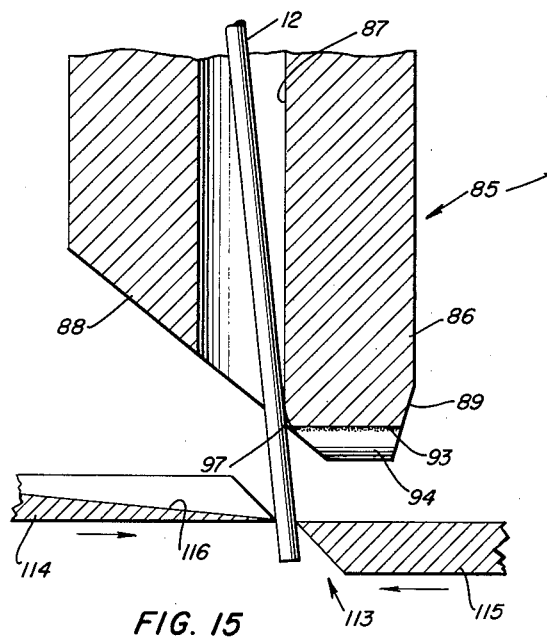
FIGS. 15 and 16 are enlarged sectional views of a groove-type needle bonding device and illustrate succeeding steps in a method of the invention.
Figure 16:
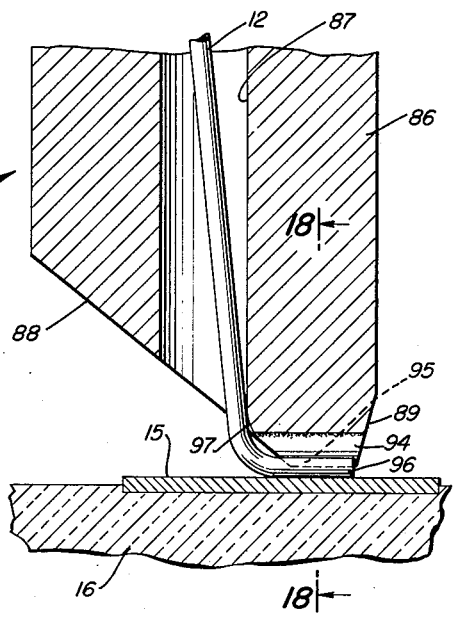
Figure 17:
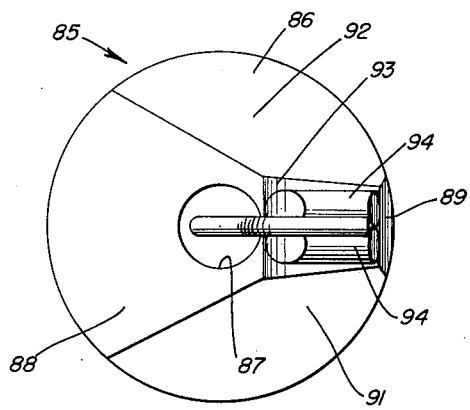
FIG. 17 is an enlarged bottom plan view of the groove-type needle bonding device of FIGS. 15 and 16.
Figure 18:
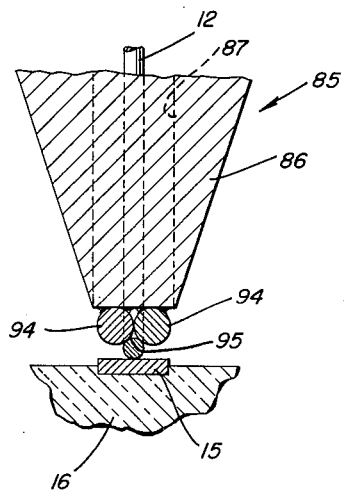
FIG. 18 is an enlarged sectional view taken along line 18—18 of FIG. 16.

Moreover, the chamfered edge 97, FIGS. 15 and 16, of the groove-type needle bonding device 85 allows a more smooth and gradual entry of the lead 12 to the bond 98 as shown at curved portion 99. Therefore, there is substantially less reduction of cross-sectional area of lead 12 than there is at the curved portion 101 of bond 84. Consequently, under a severe shock, the stresses are less concentrated at the curved portion 99 of the bond 98 than they are at the curved portion 101 of bond 84. Thus, bond 98 has a much greater ability to withstand severe shocks, which is especially important when performing bonding operations with lead 12 being a gold wire about 1 mil in diameter (this is about one-quarter as large as a human hair).

Though particularly useful in the semiconductor industry, the present invention is broadly applicable to the bonding of wire-like members to preselected parts in general.

It is to be understood that the described methods and means are simply illustrative of the application of the principles of the invention. Numerous other methods and means may be devised by those skilled in the art which will embody the principles of the invention and fall within the spirit and scope thereof.

What is claimed is:

1. A device for bonding a wire-like member to a preselected part which comprises an elongated member having a longitudinal axis and an end surface slanted with respect to said axis for forming an apex, said member having a passageway extending from said end surface at least partially through said elongated member for guiding the wire-like member, and a tip of hard material secured to said apex for bonding the guided wire-like member to said part.

2. A bonding tool which comprises a tube having an apex at one end thereof, and a tungsten bonding tip having a cylindrical configuration and being fixed to said apex such that its longitudinal axis is perpendicular to and laterally displaced from the longitudinal axis of said tube.

3. A device for bonding a wire-like member to a preselected part, which comprises means for guiding a wire-like member, and a tip of hard material having the configuration of a toroid fixed to said guiding means for applying a bonding pressure to the wire-like member while said tip is in contact with said wire-like member.

4. A horseshoe-type needle bonding device which comprises an elongated body member, a tab fixed to an end of said body member and having a passageway formed therethrough for guiding a wire-like member through said tab, and a bonding tip of a material harder than the wire-like member and having the configuration of a horseshoe and being tapered away from said passageway towards said body member and being fixed to the lower edge of said tab and to said body member such that said bonding tip is disposed circumferentially about said wire-like member guided through said tab by said passageway.

5. A horseshoe-type needle bonding device which comprises an elongated body member, a tab integrally fixed to an end of said body member and having a passageway formed therethrough substantially parallel to the longitudinal axis of said elongated body member for guiding a gold wire through said tab, and a bonding tip formed of a tungsten wire having a diameter of substantially twice that of the gold wire and having the configuration of a horseshoe and being tapered away from said passageway towards said body member and being fixed to the lower edge of said tip and to said body member such that said bonding tip is disposed circumferentially about said gold wire guided through said tab by said passageway.

6. A groove-type needle bonding tool which comprises an elongated tubular member having a passageway extending therethrough and an apex formed by tapering one end of said elongated tubular member, a portion of which apex is truncated to form a plane surface, a bonding tip formed of a pair of parallel contiguous wires tapered toward said passageway and being of a material hard relative to a wire-like member to be bonded and being fixed to said surface to form a groove adjacent said passageway of said elongated member, whereby said passageway provides a guide for passing the wire-like member into said groove for bonding and said taper of said contiguous wires provides a smooth gradual entry of the wire-like member to an ultimate bond.

7. A groove-type needle bonding tool which comprises an elongated tubular member having a passageway extending therethrough for guiding a metal wire into a bonding position and having an apex at one end formed by four tapering planes, a portion of which apex is truncated to form a plane surface at a right-angle relative to the longitudinal axis of said passageway, a bonding tip formed of a pair of parallel contiguous tungsten wires having a diameter of substantially twice that of the metal wire and being tapered towards said passageway and fixed to said plane surface to form a groove adjacent said passageway, the edges of said wires between said opening and said groove being chamfered to permit a smooth gradual entry of the metal wire from said passageway into said groove.

8. In apparatus for bonding a metal wire to a bonding area of a metal or semiconductive part, the improvement which comprises:
a means for supporting a part having a preselected bonding area onto which a metal wire is to be bonded;
a tube having a free end portion thereof arranged to facilitate pressing cooperation between an edge of the said end portion and the preselected bonding area on the part, said tube having formed therein a wire-guiding passageway with an opening adjacent to the free end portion thereof;
means for supplying a length of the metal wire through the passageway in the tube until a portion of the wire protrudes through the opening;
means for bending said protruding portion of the wire across said tube edge; and
means for effecting relative movement between the tube and the part to urge the tube edge into pressing cooperation with the bonding area on the part and press the interposed protruding portion of the wire against said bonding area with sufficient pressure to form a bond.

9. Apparatus in accordance with claim 8, in which the bonding edge of said tube is tipped with tungsten.

10. Apparatus in accordance with claim 8, which includes means for heating the part to a degree such that a thermocompression bond is formed between the wire and the part in the bonding area.

11. Apparatus in accordance with claim 8 wherein the tube comprises two separable members normally cooperating to form the wire-guiding passageway.

12. Apparatus in accordance with claim 11 wherein the edge of one of said members at the free end of the tube extends a short distance beyond the other to form the bonding edge of the tube.

13. Apparatus in accordance with claim 8 wherein the longitudinal axis of said passageway is substantially perpendicular to said tube edge and said bending means is designed to bend the protruding portion of the metal wire through an angle of approximately 90° to position the same across the tube edge.

14. Apparatus in accordance with claim 8 wherein the bending means is designed to cut the protruding portion of the wire and bend the remaining portion protruding from the opening across the tube edge.

15. Apparatus in accordance with claim 14 wherein said bending means includes a cutter blade having a beveled cutting edge positioned a predetermined distance from said tube edge with the beveled cutting edge facing said tube edge, and means for moving the cutter blade against the protruding portion of the wire to cut the wire and tuck the remaining portion protruding from the opening in the tube across the tube edge by means of engagement of said remaining portion with the beveled cutting edge of the moving cutter blade.

16. In apparatus for bonding a metal wire to a bonding area of a metal or semiconductive part, the improvement which comprises:
a movable support arm;
a bonding tool mounted on said support arm for movement therewith, said bonding tool having a free end depending from said support arm for pressing cooperation with a bonding area on a part to which a metal wire is to be bonded, the free end of said bonding tool being provided with a bonding surface and having a wire-guiding passageway with an opening adjacent to the bonding surface;
means for feeding metal wire axially through the passageway until a portion of the wire protrudes through the opening;
means for bending said protruding portion of the wire angularly with respect to the axis of the passageway and across the bonding surface at the free end of the tool;
means for moving the support arm to bring the free end of the bonding tool into cooperation with the bonding area on the part, the bent, protruding portion of the wire being interposed between the bonding surface on the tool and the bonding area on the part; and
means for urging said support arm toward the part to effect a predetermined bonding pressure between the interposed portion of the wire and the bonding area on the part.

17. A device for forming a bond between a wire-like member and a preselected part, which comprises an elongated member having an end surface and an opening extending from said end surface longitudinally into said member for guiding said wire-like member, and a pair of parallel, contiguous, cylindrical members of a hard material fixed to said end surface and forming a groove adjacent to said opening for receiving said wire-like member from said opening and serving as a bonding crotch for restraining the wire-like member as it is pressed against a part to form a bond therewith.

18. Apparatus for bonding a wire-like member to a preselected part which comprises an elongated member having an end, a bonding tip fixed to said end, said bonding tip being formed of a material harder than the wire-like member to be bonded, said member having a passageway extending from said end at least partially through said elongated member for guiding said wire-like member past said bonding tip, and cutting and orienting means including an upper blade having a V-shaped notch positioned subjacent to the bonding tip and a coacting lower blade for shearing the wire-like member so that it extends a predetermined distance past the bonding tip and for orienting the sheared wire-like member between the bonding tip and the notch of the upper blade.

19. In an apparatus for thermocompression bonding a metal wire to a preselected part wherein pressure applying means are mounted for movement relative to a support for said preselected part, the combination with said pressure applying means of an elongated member having a longitudinal axis and an end surface substantially perpendicular to said axis, said member having a passageway extending from said end surface parallel to said axis for guiding the metal wire, and a bonding tip of relatively hard material including a pair of parallel members secured to the end surface for thermocompression bonding said metal wire to said part, said elongated member being mounted on said pressing means for movement therewith to render said bonding tip effective to thermocompression bond said metal wire to said preselected part.

20. Apparatus for forming a thermocompression bond between a metal wire and a preselected part comprising a support having a slot formed therein for guiding the metal wire, a finger depending from said support and having a channel therein communicating with said slot for receiving said metal wire, and a cover removably mounted on said support for enclosing said channel to form a tube, said cover having a nose extending past said finger for urging a portion of said metal wire extending from said tube against said part to form said bond.

21. In apparatus for bonding a metal wire to a bonding area of a metal or semiconductive part, the improvement which comprises:
   a bonding tool provided at one end thereof with a bonding surface and having a passageway formed therein for guiding a metal wire to an opening of the passageway adjacent to said bonding surface;
   means for producing relative movement between the tool and at least a portion of the wire extending from said passageway to bend said portion of the wire across said bonding surface; and
   means for effecting relative movement between the bonding surface of the tool and a bonding area on a part to compress the interposed bent portion of the wire therebetween with sufficient pressure to form a bond between the wire and the part.

22. Apparatus in accordance with claim 21, wherein said bonding surface is formed by a pair of members of relatively hard material fixed to said one end of the bonding tool, said members being positioned so as to restrain lateral movement of the interposed bent portion during the application of the bonding pressure.

23. In an apparatus for bonding a metal wire to a bonding area on a metal or semiconductive part,
   a hollow support arm;
   a bonding tool secured at one end to said arm and provided at the other end with a bonding tip, said tool being formed with a passageway extending from said arm to an opening adjacent to said tip;
   means supplying a length of the metal wire into said arm for advancement into said passageway until a portion protrudes from said opening;
   means for directing pressurized gas into said hollow arm to permit unrestricted advancement of the metal wire in said passageway;
   means for forming said protruding portion around said bonding tip; and
   means for effecting relative movement between said arm and the part to urge the bonding tip toward the part and press the formed protruding portion against the bonding area to bond the metal wire to the part.

24. In an apparatus for bonding a metal wire to a bonding area of a metal or semiconductive part,
   a support arm having a bore formed therein,
   a plurality of conduits mounted on opposite sides of said arm in communication with said bore,
   a tube mounted at one end to said arm in communication with said bore and provided with a bonding edge at the other end thereof,
   means for supplying a length of the metal wire through said bore and said tube until a portion protrudes beyond said bonding edge,
   means for feeding pressurized gas through said conduits to facilitate advancement of said metal wire in said bore,
   means for bending said protruding portion on said bonding edge to interpose said portion between said edge and the bonding area, and
   means for moving the support arm toward said part to press said edge against the interposed portion and bond the portion to the bonding area.

References Cited in the file of this patent

UNITED STATES PATENTS

| | | |
|---|---|---|
| 1,465,255 | Drosey | Aug. 21, 1923 |
| 2,526,717 | Weisberg | Oct. 24, 1950 |
| 2,694,249 | Kapp | Nov. 16, 1954 |
| 2,696,656 | Madden | Dec. 14, 1954 |
| 2,779,858 | Pityo | Jan. 29, 1957 |
| 2,848,792 | Reitz | Aug. 26, 1958 |
| 2,862,543 | Kaminsky | Dec. 2, 1958 |
| 3,006,067 | Anderson | Oct. 31, 1961 |

FOREIGN PATENTS

| | | |
|---|---|---|
| 226,494 | Switzerland | July 16, 1943 |